United States Patent
Leisinger et al.

(10) Patent No.: US 11,509,188 B2
(45) Date of Patent: Nov. 22, 2022

(54) END PLATE FOR MOTOR CASING

(71) Applicant: Caterpillar Inc., Peoria, IL (US)

(72) Inventors: Keith Allen Leisinger, Brimfield, IL (US); Gregory Austin, Peoria, IL (US); Lance Mathew Cowper, Metamora, IL (US); Joseph D. Tigue, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 331 days.

(21) Appl. No.: 16/783,573

(22) Filed: Feb. 6, 2020

(65) Prior Publication Data

US 2021/0249930 A1     Aug. 12, 2021

(51) Int. Cl.
*H02K 5/15*     (2006.01)
*H02K 5/22*     (2006.01)

(52) U.S. Cl.
CPC .............. *H02K 5/225* (2013.01); *H02K 5/15* (2013.01)

(58) Field of Classification Search
CPC .................................. H02K 5/15; H02K 5/22
See application file for complete search history.

(56) References Cited

U.S. PATENT DOCUMENTS

| | | |
|---|---|---|
| 4,634,642 A | 1/1987 | Lopez-Doriga Lopez-Doriga |
| 5,006,742 A | 4/1991 | Strobl et al. |
| 7,550,886 B2 | 6/2009 | Hill et al. |
| 9,755,376 B2 | 9/2017 | Han et al. |
| 2009/0267430 A1* | 10/2009 | Imamura .............. B62D 5/0406 310/71 |
| 2014/0111044 A1* | 4/2014 | Baumann ........... H01R 13/5816 174/59 |
| 2016/0164384 A1* | 6/2016 | Johnson .............. F16H 57/0457 310/85 |
| 2021/0135534 A1* | 5/2021 | Osuga ..................... H02K 5/148 |

FOREIGN PATENT DOCUMENTS

| | | | | |
|---|---|---|---|---|
| GB | 2223888 | | 4/1990 | |
| JP | 4935567 | | 5/2012 | |
| JP | 5990885 | | 9/2016 | |
| WO | WO-2015004700 A1 * | 1/2015 | ............... H02K 5/10 |
| WO | WO-2018150743 A1 * | 8/2018 | ........... H02K 11/026 |

* cited by examiner

*Primary Examiner* — Eric Johnson
(74) *Attorney, Agent, or Firm* — von Briesen & Roper, s.c.

(57) ABSTRACT

An end plate for a motor with a motor casing. The end plate includes a body adapted to be coupled to the motor casing and cover an opening of the motor casing. The body defines a ribbed structure to shield a power terminal assembly disposed laterally outwardly with respect to the motor casing. The ribbed structure includes a first rib and a second rib spaced apart from the first rib, and the power terminal assembly is adapted to be coupled to and be captured in between the first rib and the second rib.

20 Claims, 3 Drawing Sheets

US 11,509,188 B2

END PLATE FOR MOTOR CASING

TECHNICAL FIELD

The present disclosure relates to end plates for motors, such as electric drive motors. More particularly, the present disclosure relates to an end plate that includes a rib structure for shielding a terminal assembly of an electrical motor.

BACKGROUND

In manufacturing and servicing environments, an assembly process involving the positioning and installation of electrical motors, e.g., of electrical drive units of construction machines, with respect to various frames and structures, is common. On many occasions, an installation of an electrical motor may require that the electrical motor be passed (partially or fully) through openings, apertures, or passageways (e.g., formed within the many frames and structures) that provide just the sufficient clearance for the electrical motor to transit through.

It is common for such electrical motors to include various relatively fragile and delicate parts and assemblies, e.g., a power terminal assembly, that may be applied to facilitate power supply to and/or from the electrical motor. A nature of application may require that such parts and assemblies be jutted or projected out with respect to an outer periphery of the electrical motors. During transit of the electrical motors through such passageways, features defined along such passageways, such as walls, edges, lines, tubing, brackets, may interfere with such parts and assemblies, wrecking and/or irreparably damaging such parts and assemblies, leading to one or more of a re-work production downtime, and incurrence of commensurate costs.

Japanese Patent No. 5,990,885 relates to a connector protection structure for a motor that protects a connector by preventing contact of a side member of a vehicle, which is deformed during collision of the vehicle, with the connector in a motor case.

SUMMARY OF THE INVENTION

In an aspect, the present disclosure relates to an end plate for a motor having a motor casing. The end plate includes a body adapted to be coupled to the motor casing and cover an opening of the motor casing. The body defines a ribbed structure to shield a power terminal assembly disposed laterally outwardly with respect to the motor casing. The ribbed structure includes a first rib and a second rib spaced apart from the first rib, and the power terminal assembly is adapted to be coupled to and be captured in between die first rib and the second rib.

In another aspect, the present disclosure is directed to a motor. The motor includes a motor casing defining an opening. Further, the motor includes a power terminal assembly and an end plate. The power terminal assembly is disposed laterally outwardly with respect to the motor casing and is electrically coupled to one or more power leads extending from the motor casing. The end plate includes a body coupled to the motor casing and covers the opening of the motor casing. The body defines a ribbed structure to shield the power terminal assembly. The ribbed structure includes a first rib and a second rib spaced apart from the first rib. The power terminal assembly is coupled to and is captured in between the first rib and the second rib.

In yet another aspect, the present disclosure relates to a machine. The machine includes a frame and a motor. The motor is supported by the frame. The motor includes a motor casing defining an opening, a power terminal assembly, and an end plate. The power terminal assembly is disposed laterally outwardly with respect to the motor casing and is electrically coupled to one or more power leads extending from the motor casing. The end plate includes a body coupled to the motor casing and covers the opening of the motor casing. The body defines a ribbed structure to shield the power terminal assembly. The ribbed structure includes a first rib and a second rib spaced apart from the first rib, and the power terminal assembly is coupled to and is captured in between the first rib and the second rib.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
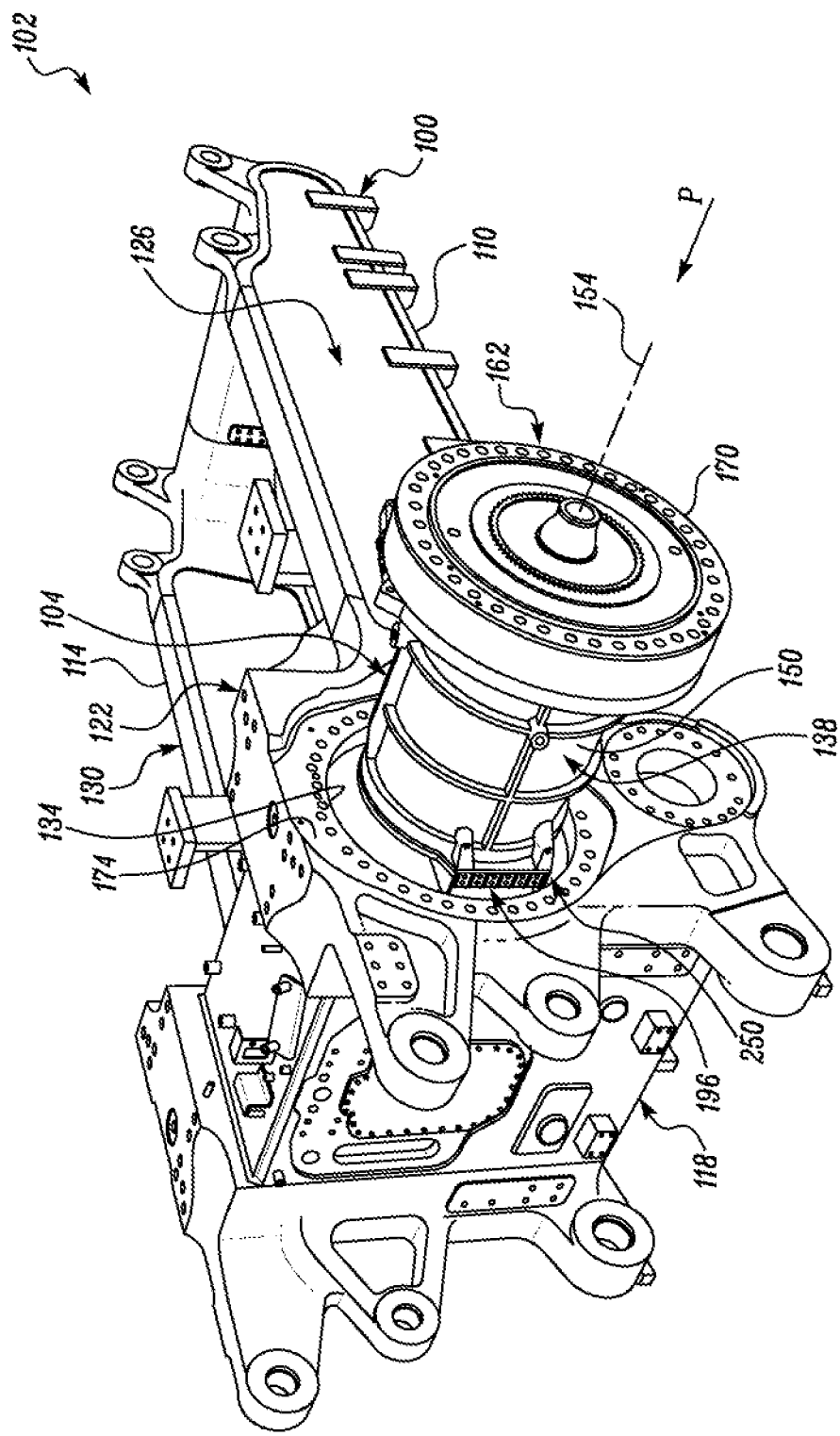
FIG. 1 is a perspective view of a frame of a machine illustrated in conjunction with a motor disposed in a position for installation with the frame of the machine, in accordance with an embodiment of the present disclosure.

Referring to FIG. 1, a frame 100 of a machine 102 is shown—various sections of the machine 102 are removed from FIG. 1 for providing clarity to the general underlying structure and configuration of the machine 102. The machine 102 may embody a track-type tractor that may include an implement, e.g., a blade, for the manipulation and/or movement of material, such as soil, rocks, stones, debris, disintegrated particles, etc. Nevertheless, aspects of the present disclosure may be applicable to other machines, such as excavators, loaders, shovels, as well. Although not limited, one or more aspects of the present disclosure may be applicable to electrically operated machines and/or electrically driven machines. Accordingly, the machine 102 may include one or more electrical motors 104, either as part of an electrical system of the machine 102 to perform and execute one or more functionalities of the machine 102, or as part of an electric, drive to provide tractive power to one or more traction devices (not shown) of the machine 102 so as to propel the machine 102.

The frame 100 may include a longitudinally and parallely extending pair of frame rails (e.g., a first rail 110 and a second rail 114). The first rail 110 and the second rail 114 may be rigidly coupled to each other by way of an intermediate connection structure 118, and both the first rail 110 and the second rail 114, in conjunction with the intermediate connection structure 118, may form part of a unitary frame structure to which various components of the machine 102 may be coupled and supported to. The first rail 110 and the second rail 114 may together (at least partly) define an interior 122 of the frame 100. Further, the first rail 110 may acquire a position relatively proximate to one lateral side of the frame 100 (e.g., to the right side 126 of the frame 100), while the second rail 114 may acquire a position relatively proximate to another (e.g., opposite) lateral side of the frame 100 (e.g., to the left side 130 of the frame 100). Both the first rail 110 and the and the second rail 114 may define corresponding apertures—an aperture 134 only for the first rail 110 is depicted in FIG. 1. A similar aperture (not shown) may be defined and formed within the second rail 114, as well.

Figure 2:
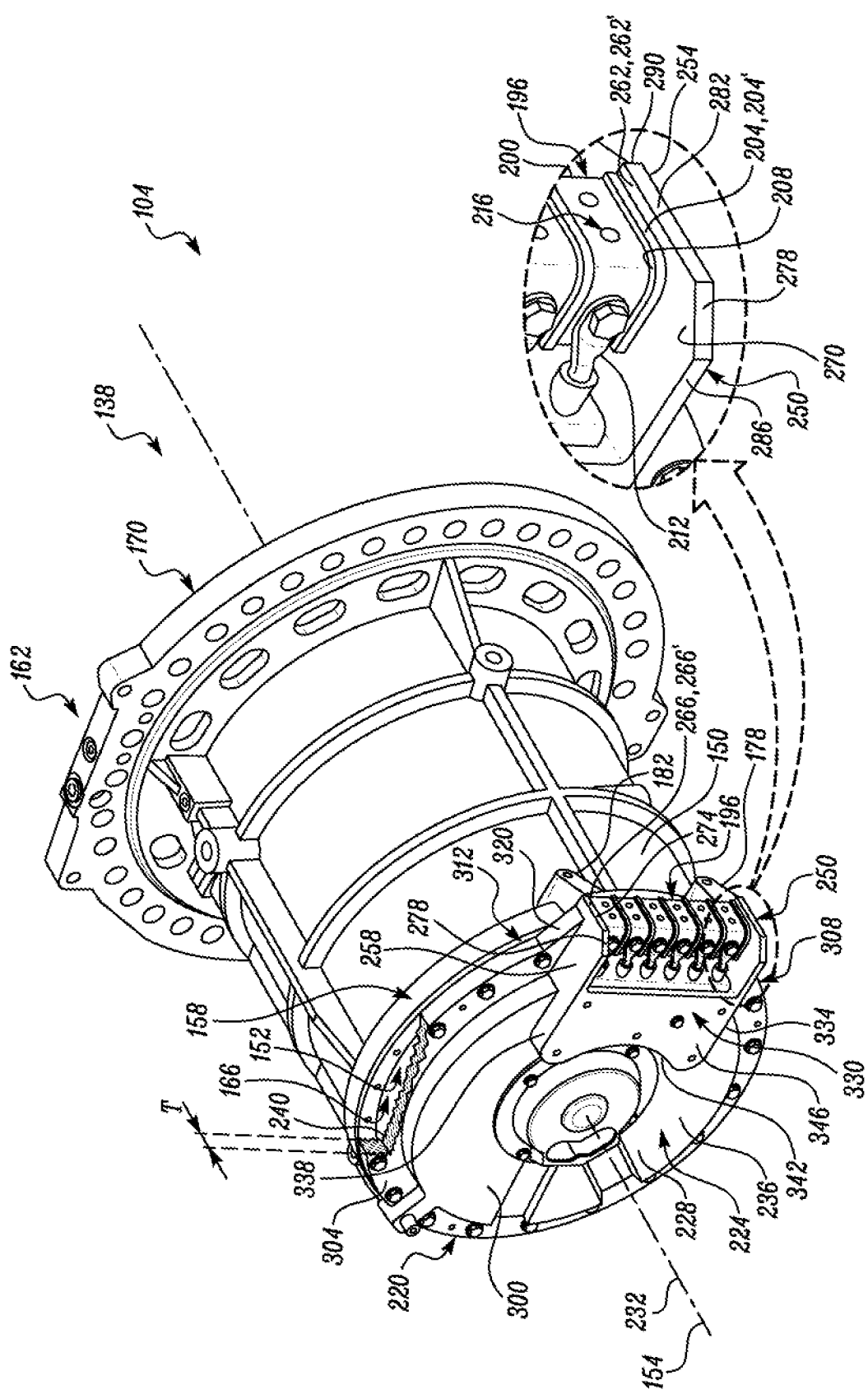
FIG. 2 is an isometric view of the motor illustrating an end plate of the motor in assembly with a motor casing of the motor, in accordance with an embodiment of the present disclosure.
Figure 3:
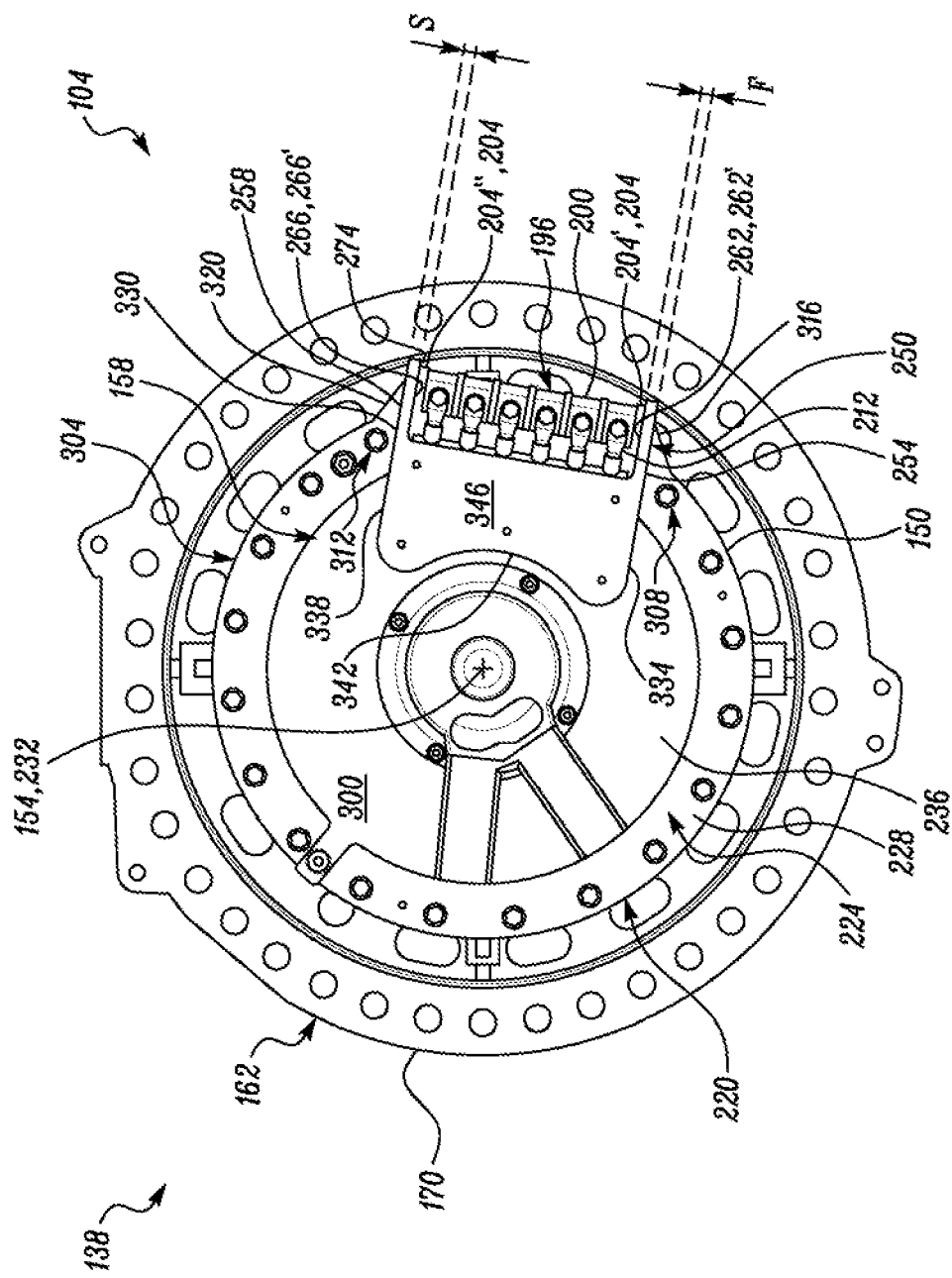
FIG. 3 is a front view of the motor illustrating various features of the end plate of the motor, in accordance with an embodiment of the present disclosure.

The electrical motors 104 may be assembled and supported on the frame 100. For example, the electrical motors 104 may include a first motor 138 and a second motor (not shown). The first motor 138 may be assembled and installed to the frame 100 by insertion into the aperture 134 defined and formed within the first rail 110, while the second motor may be assembled and installed to the frame 100 by insertion into the aperture defined and formed within the second rail 114. In so doing, the first motor 138 may be configured to be operably coupled to and provide tractive force to traction devices disposable towards the right side 126 of the frame 100, while the second motor may be configured to be operably coupled to and provide tractive force to traction devices disposable towards the left side 130 of the frame 100. For clarity and ease in understanding, only the first motor 138 is depicted in FIGS. 1-3, and discussions in the forthcoming disclosure will be largely attested with respect to the first motor 138 alone—these discussions, however, may be suitably applied to the second motor as well. Also, for simplicity, the first motor 138 may simply and interchangeably be referred to as the motor 138, hereinafter.

Referring to FIGS. 1 and 2, the motor 138 may include a motor casing 150. As an example, the motor casing 150 may include a hollow, cylindrically shaped profile with a cavity 152 therein (visualized by viewing a cut section illustrated in FIG. 2). The motor casing 150 may define an axis (e.g., a casing axis 154) centrally to the cylindrically shaped profile and along which an elongation (i.e., a length or a height) of the motor casing 150 may be defined and disposed. Further, the motor casing 150 may define one or more axial ends, e.g., a first axial end 158 and a second axial end 162 between which the elongation of the motor casing 150 may extend.

An opening 166 may be defined at the first axial end 158 and a flanged portion 170 may be defined at the second axial end 162, as shown—the opening 166 may also be visualized by viewing the cut section illustrated in FIG. 2. The flanged portion 170 may be coupled to an edge portion 174 (see FIG. 1) of the frame 100 that surrounds and defines the aperture 134. The opening 166 at the first axial end 158 may allow access into the cavity 152 of the motor casing 150. Further, the motor casing 150 may include a pair of protuberances, e.g., a first protuberance 178 and a second protuberance 182. Both the first protuberance 178 and the second protuberance 182 may extend laterally outwardly with respect to the motor casing 150, as depicted. Also, both the first protuberance 178 and the second protuberance 182 may be integrally formed with the motor casing 150.

The motor 138 or the motor casing 150 may include a rotor portion and a stator portion (not shown). Both the rotor portion and the stator portion are assembled and housed within the cavity 152. The stator portion may induce and modulate a magnetic flux when powered (e.g., electrically) and may provide rotary torque to the rotor portion, such that the rotor portion may rotate about the casing axis 154, in turn powering rotation of a motor shaft.

Referring to FIGS. 2 and 3, the motor 138 may include a power terminal assembly 196 that facilitates the electrical powering and running of the motor 138. For example, the power terminal assembly 196 may include an arrangement that extends longitudinally, as shown. As exemplarily depicted, the arrangement of the power terminal assembly 196 may include a series of bus bars 200 (e.g., made of copper). The series of bus bars 200 may be spilt and insulated from each other in generally regular intervals by insulators 204 (e.g., made of plastic). Only one bus bar 200 and one insulator 204 is annotated in the figures to save clarity in the figures. The arrangement of the power terminal assembly 196 may be such that each bus bar 200 may contact and positively lie in between a pair of insulators 204. In so doing, the arrangement of the power terminal assembly 196 includes an insulator 204 (e.g., a first insulator 204') at the start of the arrangement and an insulator (e.g., a second insulator 204") at the end of the arrangement (also see FIG. 3). It, may be noted that the insulators 204 may possess a generally larger surface area than an area defined by the bus bars 200, and, accordingly, a contact between a bus bar 200 and an insulator 204 may be such that the insulator 204 may define an insulated overhang region 208 extending outwardly with respect to the bus bar 200.

Power leads 212 (only one annotated) extending from the motor casing 150 (e.g., from the stator portion and/or from the rotor portion) may extend out (e.g., from the cavity 152 via the opening 166) and be electrically coupled to the power terminal assembly 196, e.g., correspondingly to the bus bars 200 of the power terminal assembly 196. In some embodiments, another set (e.g., a complementary set) of power leads (not shown) may be electrically coupled to suitable ports 216 of the power terminal assembly 196 and may extend up to a power source (e.g., an electrical power source) so as to complete an associated electrical circuit, and, thereby, enable a supply of power (e.g., electrical power) to the motor 138 from the power source. The power source may include a battery, for example.

As exemplarily shown the power terminal assembly 196 may be disposed laterally outwardly with respect to the motor casing 150, such that the power terminal assembly 196 may jut outwards or project outwards from the motor casing 150. Further, the power terminal assembly 196 may be disposed at a region that is relatively close to the first axial end 158 of the motor casing 150. Exemplarily, the longitudinal configuration of the power terminal assembly 196 may define an elongated or linear profile that acquires a generally perpendicular configuration with respect to the casing axis 154 when disposed laterally outwardly with respect to the motor casing 150. The term 'generally', used here and elsewhere in the present disclosure, may be applicable to accommodate one or more of manufacturing tolerances, design/specification variations arising out of routine skill, or to suit assembly and spatial requirements.

The motor 138 may include an end plate 220 that may be assembled to the first axial end 158 of the motor casing 150. More particularly, the end plate 220 may include a body 224 having a circular or an annular profile. In this regard, the body 224 may include an annular body 228, as shown. The annular body 228 may define an axis 232 (referred to as body axis 232 hereinafter) and a thickness, T, extending and defined along the body axis 232. The body 224 may be adapted to be coupled to the motor casing 150 at the first axial end 158 to cover the opening 166 of the motor casing 150 defined at the first axial end 158. To this end, the body 224 defines a first end surface 236 and a second end surface 240. The second end surface 240 is adapted to face (i.e., to be directed towards) the opening 166 and the first end surface 236 is disposed opposite to the second end surface 240—in other words, the first end surface 236 is disposed to be directed away from the opening 166. The body 224 of the end plate 220 may be coupled to the first axial end 158 by way of suitable fastening means (e.g., threaded fasteners, such as bolts) to cover the opening 166. Similar such means may be contemplated by someone of skill in the art, and, accordingly, such means will not be discussed any further in the present disclosure. The body 224 defines a ribbed structure 250, as shown. The ribbed structure 250 shields the power terminal assembly 196 disposed laterally outwardly with respect to the motor casing 150. The ribbed structure 250 of the body 224 will be now discussed further.

The ribbed structure 250 includes a first rib 254 and a second rib 258. The second rib 258 is spaced apart from the first rib 254 to define a space therebetween. The space, as defined between the first rib and the second rib, facilitates accommodation of the power terminal assembly 196 therein, and thus allows the power terminal assembly 196 to be coupled to and be captured in between the first rib 254 and the second rib 258, as shown. Moreover, the first rib 254 and the second rib 258 may fall in line to be level with the first protuberance 178 and the second protuberance 182, respectively. Although two ribs (i.e., the first rib 254 and the second rib 258) are disclosed, additional or lesser number of ribs may be contemplated.

Both the first rib 254 and the second rib 258 may be similarly shaped and structured, and may extend linearly and radially outwardly (e.g., in the form of a yoke) from the annular body 228, as shown. For example, both the first rib 254 and the second rib 25$ may define similar outward extensions (e.g., distances) with respect to a perimeter of the annular body 228—although variations to such an extension may be contemplated. As an example, the first rib 254 and the second rib 258 may be cast-in or be integral to the annular body 228 and may correspondingly define a generally plate-like cuboidal structure having corresponding surfaces that extend generally planarly, as shown. As an example, the first rib 254 defines a first rib surface 262 and the second rib 258 defines a second rib surface 266. The first rib surface 262 and the second rib surface 266 may face each other, define similar surface areas, and may extend generally planarly to be defined in and along respective planes, e.g., a first plane 262' and a second plane 266'. The planes (i.e., the first plane 262' and the second plane 266') may be parallel to each other and may extend along the body axis 232 defined by the annular body 228.

A coupling and capture of the power terminal assembly 196 in between the first rib 254 and the second rib 258 may mean that the first insulator 204' of the power terminal assembly 196 abuts and sits (e.g., by bolting or adhesives) against the first rib surface 262, while the second insulator 204" abuts and sits (e.g., by bolting or adhesives) against the second rib surface 266. It may be noted that a surface area defined by the first rib surface 262 may be larger than the surface area defined by the first insulator 204', and, similarly, the surface area defined by the second rib surface 266 may be larger than the surface area defined by the second insulator 204". In that manner, the first rib 254 may define a first rib overhang section 270 with respect to the first insulator 204', while the second rib 258 may define a second rib overhang section 274 with respect to the second insulator 204".

Both the first rib 254 and the second rib 258 may define corresponding thicknesses, F, S, with the thicknesses, F, S, being disposed and extending generally orthogonally with respect to the thickness, T, of the annular body 228 (see FIGS. 2 and 3 in conjunction). Further, the first rib 254 and the second rib 258 may define a chamfered edge 278 at one or more axially opposed sides of the annular body 228. In this regard, and with respect to the first rib 254, for example, the cuboidal structure of the first rib 254 may be such that the first rib 254 defines a first surface 282, a second surface 286, and a third surface 290, disposed in a generally U-shaped configuration (see enlarged portion of the first rib 254). Each of the first surface 282, the second surface 286, and the third surface 290, may be disposed generally perpendicularly to the first rib surface 262. The first surface 282 may be disposed remote and thus be farthest among the surfaces 282, 286, 290 with respect to the annular body 228 (e.g., with respect to a center defined by the annular body 228) and may extend generally perpendicularly to the first rib surface 262. The second surface 286 may be disposed relatively distally to the motor casing 150, while the third surface 290 may be disposed relatively proximally to the motor casing 150. Both the second surface 286 and the third surface 290 may be disposed generally at right angles with respect to the first surface 282 and the first rib surface 262.

The chamfered edge 278 of the first rib 254 may be defined between the first surface 282 and the second surface 286, as shown. As may be visualized, the chamfered edge 278 defines an inclination with respect to the body axis 232. Similar structural discussions may be contemplated for the second rib 258 as well—for example, the second rib 258 may include a chamfered edge 278 as well. It may be noted that the chamfered edges 278 of the first rib 254 and the second rib 258 makes the first rib 254 and the second rib 258 devoid of any sharp edges and eases an entry of the motor 138 through the aperture 134 during an assembly of the motor 138 to the frame 100. For clarity it may be noted that certain annotations in the figures have been directed solely towards the first rib 254. Similar or equivalent annotations may be suitably applied to the second rib 258, as well.

In some embodiments, the annular body 228 defines a hub portion 300 and a rim portion 304 surrounding the huh portion 300. The rim portion 304 may define a relatively reduced height (or length) from the second end surface 240, while the hub portion 300 may define a relatively increased height from the second end surface 240. As shown, the rim portion 304 defines a curvature that starts at a first curvature end 308, extends around the hub portion 300, and terminates at a second curvature end 312. The body 224 defines a first stiffener 316 and a second stiffener 320. For example, the first stiffener 316 is integrally and contiguously merged with the rim portion. 304 and the first rib 254 at the first curvature end 308, and the second stiffener 320 is integrally and contiguously merged with the rim portion 304 and the second rib 258 at the second curvature end 312. The first stiffener 316 provides structural rigidity to the first rib 254, while the second stiffener 320 provides structural rigidity to the second rib 258.

According to some embodiments of the present disclosure, the body 224 defines a recessed port 330 to receive and route one or more of the power leads 212 extending from the motor casing 150 (e.g., from the cavity 152 of the motor casing 150) to reach up to the power terminal assembly 196. The recessed port 330 is open to the second end surface 240, extends generally linearly from the second end surface 240 towards the first end surface 236. The recessed port 330 may be defined by a first wall 334, a second wall 338 spaced apart from the first wall 334, and a third wall 342 extending between the first wall 334 and the second wall 338. An absence of a fourth wall, as may be visualized from FIG. 2, helps the recessed port 330 define a slot that opens laterally to the body axis 232 or to the motor casing 150 in the direction of the power terminal assembly 196, and through which one or more of the power leads 212 from the motor casing 150 may pass through and travel up to the power terminal assembly 196 to be electrically coupled to the power terminal assembly 196.

Further, an extension of the recessed port 330 towards the first end surface 236 (and beyond) may be delimited by an end wall 346. The end wall 346 may extend up to each of the first wall 334, the second wall 338, and the third wall 342, to cover at least a portion of the recessed port 330 at the first end surface 236 to shield at least a portion of the power leads 212 routed and passed through the recessed port 330.

It may be noted that the first rib 254 and the second rib 258 may extend integrally and contiguously from the first wall 334 and the second wall 338, respectively. It may be further noted, that the various features of the end plate 220, as discussed above, including the ribbed structure 250, the walls 334, 338, 342, 346 defining the recessed port 330, the first stiffener 316, the second stiffener 320, the rim portion 304, and the hub portion 300, may be all integrally and rigidly formed, for example, by casting material (e.g., a metallic material or an alloy) into a single mold.

INDUSTRIAL APPLICABILITY

During an exemplary assembly of the motor 138 to the frame 100 (e.g., during manufacturing and/or servicing operations throughout a life of the machine 102), an operator may insert the motor 138 into the aperture 134, with, for example, the first axial end 158 of the motor casing 150, and the end plate 220 coupled thereto, entering the aperture 134 first. During such entry, the chamfered edges 278 of the first rib 254 and the second rib 258 eases motor ingress and mitigates any substantial interruption in movement of the motor 138 through the aperture 134 that may have occurred had sharp edges been present in place of the chamfered edges 278. An operator may push the motor 138 (see direction, P, FIG. 1) further through the aperture 134 such that the motor 138 may suitably enter all the way into the interior 122 of the frame 100, and such that the hanged portion 170 of the motor 138 may meet the edge portion 174 that surrounds the aperture 134 of the frame 100. An operator may then bring forth suitable tools (e.g., spanners or automated tools) to assemble the motor 138 to the frame 100 by driving fasteners (not shown) through both the edge portion 174 and the flanged portion 170, in turn securing the motor 138 to the frame 100. Various other assembling positions and configurations of the motor 138 with respect to the frame 100 and the aperture 134 may be contemplated.

During the aforesaid exemplary assembly, as the first axial end 158 of the motor casing 150 (along with the components and devices disposed in proximity to the first axial end 158, e.g., the power terminal assembly 196 and the end plate 220) enters into the aperture 134, various features, such as tubes, etc., disposed in the interior 122 of the frame 100, or features of the frame 100 itself, such as the edge portion 174 surrounding the aperture 134, and the like, are likely to come into contact and interfere with the power terminal assembly 196 of the motor 138. With the presence of the ribbed structure 250, however, several of the aforesaid features would fail to reach up to interfere and cause any damage to the power terminal assembly 196. In particular, the rigid and integral structure afforded to the ribbed structure 250 presents an effective deterrence against any such interference. It may be noted that the larger surface areas of the first rib surface 262 and second rib surface 266 or the first rib overhang section 270 and the second rib overhang section 274 aids and restricts several of the features to come into direct contact with the power terminal assembly 196. Additionally, during or pursuant to the aforesaid assembly, the first rib 254 and the second rib 258 may rest or abut against one or more portions of the frame 100 and may prevent various portions of the frame 100 from interfering with the power terminal assembly 196. Effectively, presence of the ribbed structure 250 leads to an efficient and secure assembling of the motor 138 with respect to the frame 100 and prolongs the life of power terminal assembly 196. In one or more instances, it may be noted that the first protuberance 178 and the second protuberance 182 (e.g., in conjunction with the first rib 254 and the second rib 258) may also help in keeping the power terminal assembly 196 away from such interferences.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

What is claimed is:

1. An end plate for a motor with a motor casing, the end plate comprising:
    a body adapted to be coupled to the motor casing and cover an opening of the motor casing, the body including a ribbed structure and an annular body that defines a body axis, the ribbed structure configured to shield a power terminal assembly disposed laterally outwardly with respect to the motor casing, wherein
    the ribbed structure includes a first rib that comprises a first rib surface and a second rib that comprises a second rib surface, the second rib spaced apart from the first rib to define a first space between the first rib surface and the second rib surface, the first rib and the second rib configured to receive the power terminal assembly disposed in the first space on the first rib surface and the second rib surface, the first rib and the second rib each further configured to extend laterally outward from the power terminal assembly and the motor casing in a direction perpendicular to the body axis, wherein the first rib and the second rib overlap the power terminal assembly.

2. The end plate of claim 1, wherein each of the first rib and the second rib extends linearly and radially outwardly from the annular body.

3. The end plate of claim 2, wherein the annular body defines a hub portion and a rim portion surrounding the hub portion, a curvature of the rim portion starting at a first curvature end, extending around the hub portion, and terminating at a second curvature end, the body defining:
    a first stiffener integrally and contiguously merged with the rim portion and the first rib at the first curvature end, and
    a second stiffener integrally and contiguously merged with the rim portion and the second rib at the second curvature end.

4. The end plate of claim 2, wherein the first rib and the second rib are defined in and along respective planes that are parallel to each other, each plane extending along the body axis defined by the annular body, each of the first rib and the second rib defining a chamfered edge at one or more axially opposed sides of the annular body, wherein the chamfered edge defines an inclination with respect to the axis.

5. The end plate of claim 1, wherein the body defines a recessed port to receive and route one or more power leads extending from the motor casing to reach up to the power terminal assembly.

6. The end plate of claim 5, wherein the body defines a first end surface and a second end surface, the second end surface adapted to face the opening and the first end surface disposed opposite to the second end surface, wherein the recessed port is open to the second end surface, extends generally linearly from the second end surface towards the first end surface, and is defined by a first wall, a second wall spaced apart from the first wall, and a third wall extending between the first wall and the second wall, an extension of the recessed port towards the first end surface being delimited by an end wall extending up to each of the first wall, the second wall, and the third wall, the end wall shielding at least a portion of the one or more power leads routed through the recessed port.

7. The end plate of claim 6, wherein the first rib and the second rib extend integrally and contiguously from the first wall and the second wall, respectively.

8. A motor, comprising:
a motor casing defining an opening;
a power terminal assembly disposed laterally outwardly with respect to the motor casing and being electrically coupled to one or more power leads extending from the motor casing, the power terminal assembly coupled to a first rib and a second rib of a rib structure; and
an end plate including a body coupled to the motor casing and covering the opening of the motor casing, the body including the ribbed structure and an annular body that defines a body axis, the ribbed structure configured to shield the power terminal assembly, wherein
the ribbed structure includes the first rib that comprises a first rib surface and the second rib that comprises a second rib surface, the second rib spaced apart from the first rib to define a first space between the first rib surface and the second rib surface, the first rib and the second rib configured to receive the power terminal assembly disposed in the first space on the first rib surface and the second rib surface, the first rib and the second rib each extending laterally outward from the power terminal assembly and the motor casing in direction perpendicular to the body axis, wherein the first rib and the second rib overlap the power terminal assembly.

9. The motor of claim 8, wherein each of the first rib and the second rib extends linearly and radially outwardly from the annular body.

10. The motor of claim 9, wherein the annular body defines a hub portion and a rim portion surrounding the hub portion, a curvature of the rim portion starting at a first curvature end, extending around the hub portion, and terminating at a second curvature end, the body defining:
a first stiffener integrally and contiguously merged with the rim portion and the first rib at the first curvature end, and
a second stiffener integrally and contiguously merged with the rim portion and the second rib at the second curvature end.

11. The motor of claim 9, wherein the first rib and the second rib are defined in respective planes that are parallel to each other, each plane extending along the body axis defined by the annular body, each of the first rib and the second rib defining a chamfered edge at one or more axially opposed sides of the annular body, wherein the chamfered edge defines an inclination with respect to the axis.

12. The motor of claim 8, wherein the body defines a recessed port to receive and route the one or more power leads to reach up to the power terminal assembly.

13. The motor of claim 12, wherein the body defines a first end surface and a second end surface, the second end surface facing the opening and the first end surface disposed opposite to the second end surface, wherein the recessed port is open to the second end surface, extends generally linearly from the second end surface towards the first end surface, and is defined by a first wall, a second wall spaced apart from the first wall, and a third wall extending between the first wall and the second wall, an extension of the recessed port towards the first end surface being delimited by an end wall extending up to each of the first wall, the second wall, and the third wall, the end wall shielding at least a portion of the one or more power leads routed through the recessed port.

14. The motor of claim 13, wherein the first rib and the second rib extend integrally and contiguously from the first wall and the second wall, respectively.

15. A machine, comprising:
a frame;
a motor supported by the frame, the motor comprising:
a motor casing defining an opening;
a power terminal assembly disposed laterally outwardly with respect to the motor casing and being electrically coupled to one or more power leads extending from the motor casing, the power terminal assembly coupled to a first rib and a second rib of a rib structure; and
an end plate including a body coupled to the motor casing and covering the opening of the motor casing, the body including the ribbed structure and an annular body that defines a body axis, the ribbed structure configured to shield the power terminal assembly, wherein
the ribbed structure includes the first rib that comprises a first rib surface and the second rib that comprises a second rib surface, the second rib spaced apart from the first rib to define a first space between the first rib surface and the second rib surface, the first rib and the second rib configured to receive the power terminal assembly disposed in the first space on the first rib surface and the second rib surface, the first rib and the second rib each extending laterally outward from the power terminal assembly ad the motor easing in a direction perpendicular to the body axis, wherein the first rib and the second rib overlap the power terminal assembly.

16. The machine of claim 15, each of the first rib and the second rib extends linearly and radially outwardly from the annular body.

17. The machine of claim 16, wherein the annular body defines a hub portion and a rim portion surrounding the hub portion, a curvature of the rim portion starting at a first curvature end, extending around the hub portion, and terminating at a second curvature end, the body defining:
a first stiffener integrally and contiguously merged with the rim portion and the first rib at the first curvature end, and
a second stiffener integrally and contiguously merged with the rim portion and the second rib at the second curvature end.

18. The machine of claim 15, wherein the body defines a recessed port to receive and route the one or more power leads to reach up to the power terminal assembly.

19. The machine of claim 18, wherein the body defines a first end surface and a second end surface, the second end surface facing the opening and the first end surface disposed opposite to the second end surface, wherein the recessed port is open to the second end surface, extends generally linearly from the second end surface towards the first end surface, and is defined by a first wall, a second wall spaced apart from the first wall, and a third wall extending between the first wall and the second wall, an extension of the recessed port towards the first end surface being delimited by an end wall extending up to each of the first wall, the second wall, and the third wall, the end wall shielding at least a portion of the one or more power leads routed through the recessed port.

20. The machine of claim 19, wherein the first rib and the second rib extend integrally and contiguously from the first wall and the second wall, respectively.

\* \* \* \* \*